US012596355B2

(12) United States Patent
Shao et al.

(10) Patent No.: US 12,596,355 B2
(45) Date of Patent: Apr. 7, 2026

(54) INDUSTRIAL INTERNET OF THINGS, METHODS AND MEDIUMS FOR EARLY WARNING OF DESCENDING FUNCTION FAULT OF EQUIPMENT

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Yuefei Wu, Chengdu (CN); Yuhao Chen, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 384 days.

(21) Appl. No.: 18/329,679

(22) Filed: Jun. 6, 2023

(65) Prior Publication Data

US 2023/0315062 A1 Oct. 5, 2023

Related U.S. Application Data

(63) Continuation of application No. PCT/CN2022/106031, filed on Jul. 15, 2022.

(51) Int. Cl.
*G05B 19/41* (2006.01)
*G05B 19/418* (2006.01)

(52) U.S. Cl.
CPC .............................. *G05B 19/4184* (2013.01)

(58) Field of Classification Search
CPC .................................................. G05B 19/4184
See application file for complete search history.

(56) References Cited

U.S. PATENT DOCUMENTS

2013/0204808 A1* 8/2013 Jiang ...................... G06N 20/00
706/46
2017/0308802 A1* 10/2017 Ramsøy ................. G06N 20/00
(Continued)

FOREIGN PATENT DOCUMENTS

CN 105677554 A 6/2016
CN 112163014 A 1/2021
(Continued)

OTHER PUBLICATIONS

Zhi Wang, "Internet of things management system and method for satellite final assembly equipment" (ip.com machine translation of application CN112163014A), Jan. 1, 2021, ip.com machine translations (Year: 2021).*
(Continued)

*Primary Examiner* — Christopher W Carter
(74) *Attorney, Agent, or Firm* — Runzhi Lai

(57) ABSTRACT

The present disclosure provides an Industrial Internet of Things for early warning of descending function fault of equipment, comprising a management platform, wherein the management platform is configured to perform following operations including: obtaining execution status of at least one production task executed by equipment in a preset time period; based on the execution status of the at least one production task, judging whether the equipment has a descending function fault; in response to the equipment having the descending function fault, issuing an early warning and repairing the equipment.

15 Claims, 6 Drawing Sheets

(56)          References Cited

U.S. PATENT DOCUMENTS

| 2019/0130284 | A1  |  5/2019 | Chakraborty et al. |
| 2019/0273784 | A1* |  9/2019 | Shao .................... H04W 84/04 |
| 2022/0365524 | A1* | 11/2022 | Van Oldenborgh ........................ G05B 23/0289 |

FOREIGN PATENT DOCUMENTS

| CN | 112217283 | A | 1/2021 |
| CN | 114449023 | A | 5/2022 |
| CN | 114488988 | A | 5/2022 |
| CN | 114741454 | A | 7/2022 |
| CN | 114742254 | A | 7/2022 |
| CN | 114742487 | A | 7/2022 |

OTHER PUBLICATIONS

Notice of Reasons for Refusal in Japanese Application No. 2023-547530 mailed on Sep. 17, 2024, 9 pages.

\* cited by examiner

200

<u>300</u>

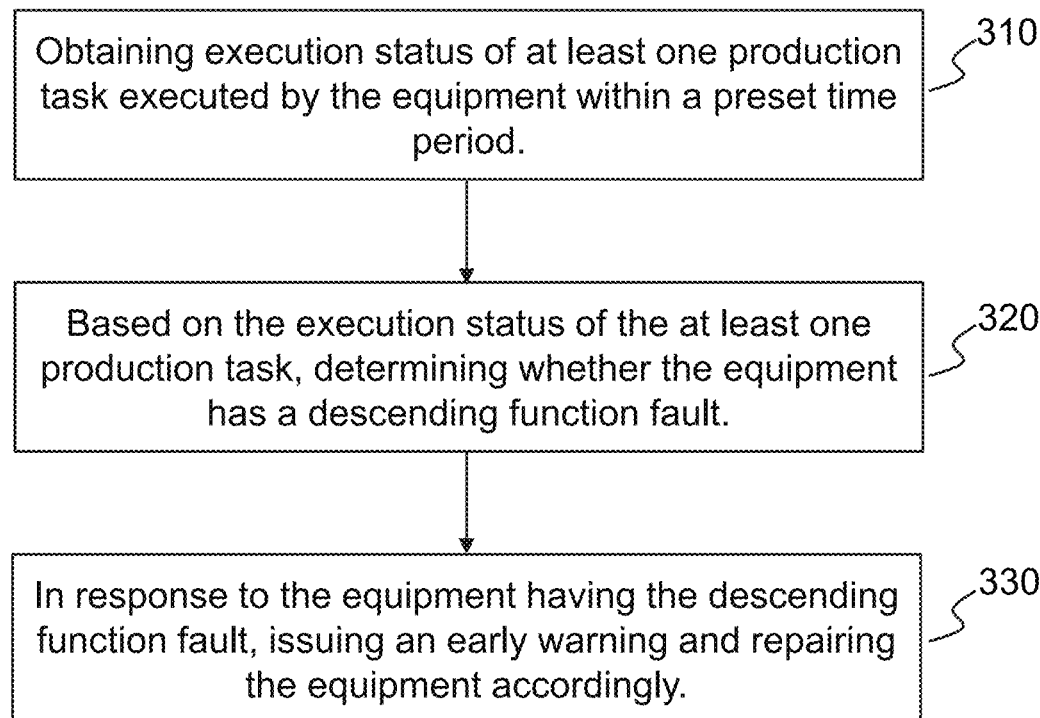

Obtaining execution status of at least one production task executed by the equipment within a preset time period. 310

Based on the execution status of the at least one production task, determining whether the equipment has a descending function fault. 320

In response to the equipment having the descending function fault, issuing an early warning and repairing the equipment accordingly. 330

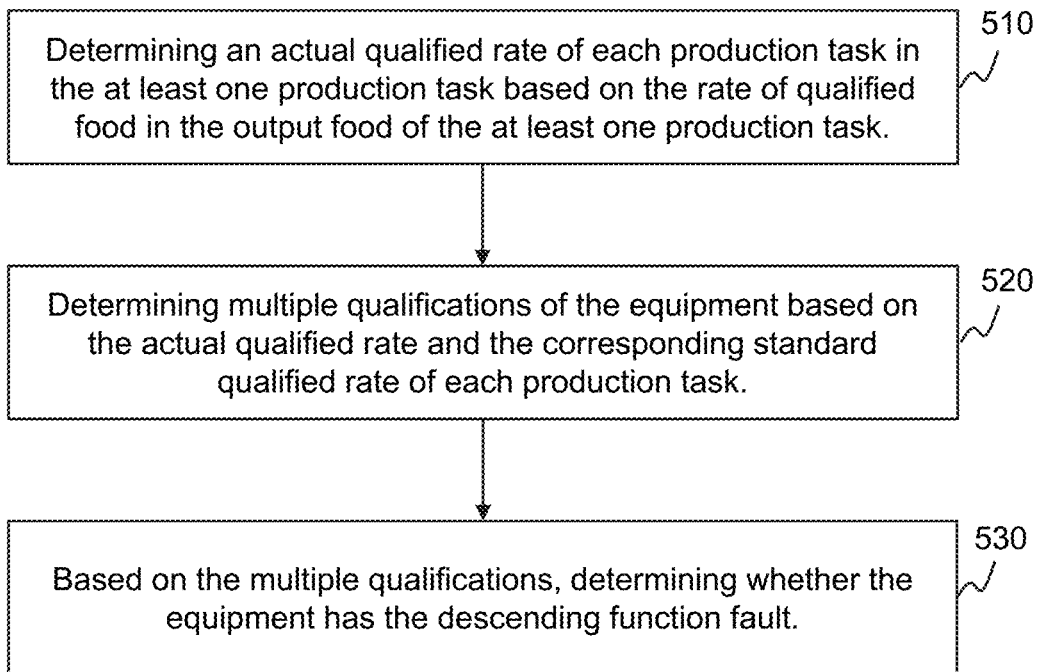

510

Determining an actual qualified rate of each production task in the at least one production task based on the rate of qualified food in the output food of the at least one production task.

520

Determining multiple qualifications of the equipment based on the actual qualified rate and the corresponding standard qualified rate of each production task.

530

Based on the multiple qualifications, determining whether the equipment has the descending function fault.

FIG. 5

INDUSTRIAL INTERNET OF THINGS, METHODS AND MEDIUMS FOR EARLY WARNING OF DESCENDING FUNCTION FAULT OF EQUIPMENT

CROSS-REFERENCE TO RELATED APPLICATIONS

This application is a Continuation of International Application No. PCT/CN2022/106031, filed on Jul. 15, 2022, the entire contents of each of which are hereby incorporated by reference.

TECHNICAL FIELD

This present disclosure relates to the technical field of the Internet of Things, and in particular to an industrial Internet of Things, a method and a medium for fault early warning of descending equipment function.

BACKGROUND

Since production efficiency directly determines production costs, production efficiency has always been the focus of enterprises. In smart manufacturing, a production line is set up and run by multiple smart manufacturing equipment in the sequence of processes or the time sequence of manufacturing execution, if each equipment can guarantee and improve its own production efficiency, the overall production efficiency of the production line can be improved, thereby reducing production costs. However, due to the mutual friction and stress of the internal structure of the equipment, there may be obstacles of the descending equipment function, resulting in a decrease in production efficiency.

Therefore, it is hoped to propose an industrial Internet of Things and a control method for fault early warning of descending equipment function, so as to obtain equipment faults in advance and solve them in time, so as to ensure the normal use of production line equipment and ensure production efficiency.

SUMMARY

This present disclosure provides an industrial Internet of Things for fault early warning of descending equipment function, the Industrial Internet of Things includes a management platform, the management platform is configured to do following operations including: obtaining execution status of at least one production task executed by equipment in a preset time period; based on the execution status of the at least one production task, judging whether the equipment has a descending function fault; in response to the equipment having the descending function fault, issuing an early warning and repairing the equipment.

This present disclosure provides a control method for an Industrial Internet of Things for fault early warning of descending equipment function, which is realized by the management platform based on the Industrial Internet of Things for fault early warning of descending equipment function; the control method includes: obtaining execution status of at least one production task executed by equipment in a preset time period; based on the execution status of the at least one production task, judging whether the equipment has a descending function fault; in response to the equipment having the descending function fault, issuing an early warning and repairing the equipment.

This present disclosure provides a non-transitory computer-readable storage medium, wherein the storage medium stores computer instructions, after the computer reads the computer instructions in the storage medium, the computer implement the control method when the computer is executed by a processor.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same number denote the same structure, with:

FIG. 3 is an exemplary flowchart illustrating a control method for the Industrial Internet of Things for fault early warning of descending equipment function according to some embodiments of the present disclosure;

FIG. 5 is an exemplary flowchart illustrating a process for determining fault of descending equipment function based on qualifications according to some embodiments of the present disclosure;

DETAILED DESCRIPTION

Figure 1:
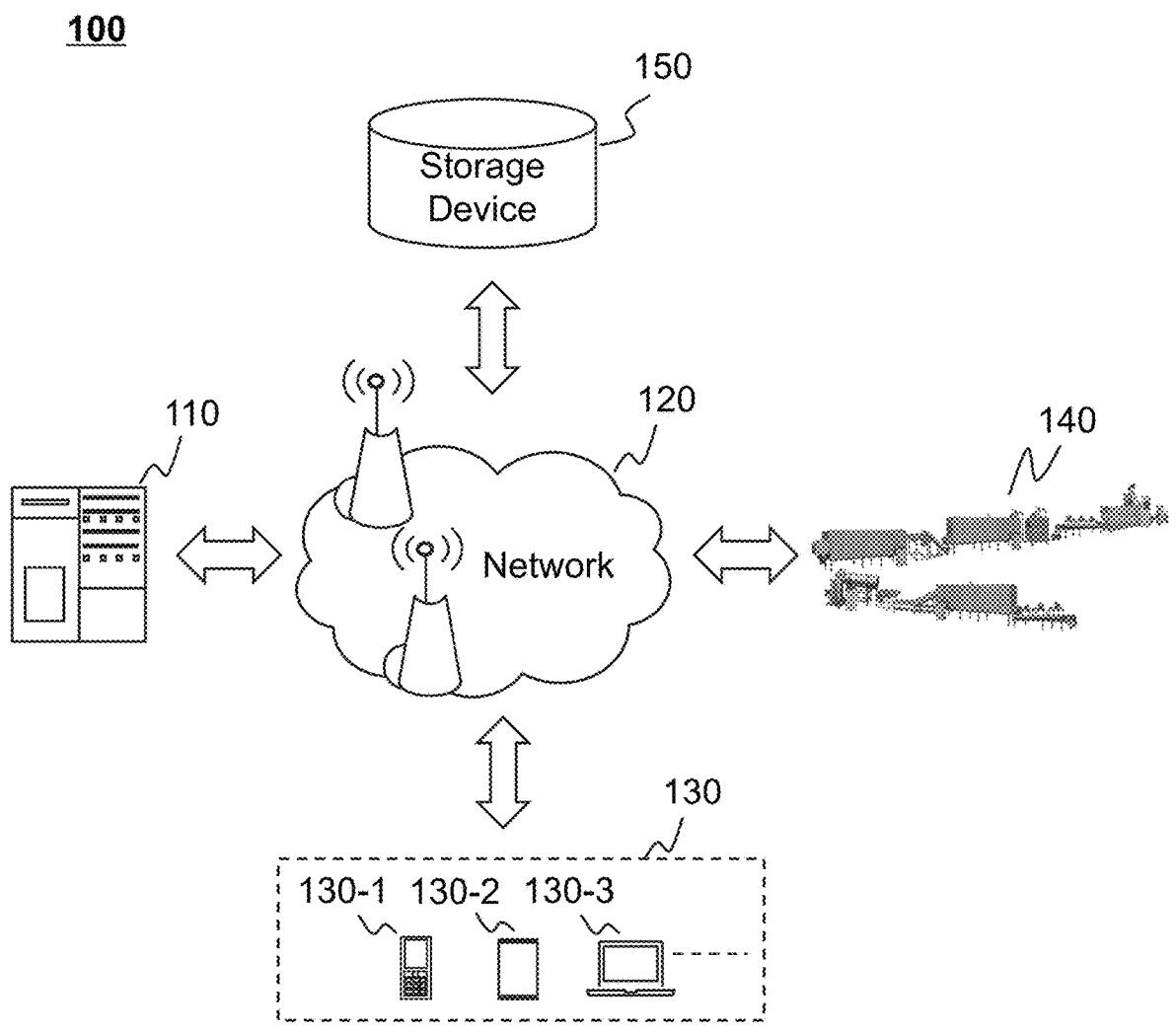
FIG. 1 is a schematic diagram illustrating an application scenario of the Industrial Internet of Things for fault early warning of descending equipment function according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include,"

"includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in sequence. Conversely, the operations may be implemented in an inverted sequence, or simultaneously. Moreover, one or more other operations may be added to the flowcharts. One or more operations may be removed from the flowcharts.

FIG. 1 is a schematic diagram illustrating an application scenario of the Industrial Internet of Things for fault early warning of descending equipment function according to some embodiments of the present disclosure.

As shown in FIG. 1, an application scenario 100 of the Industrial Internet of Things for fault early warning of descending equipment may include a server 110, a network 120, a terminal device 130, a production line 140 and a storage device 150.

In some embodiments, the application scenario 100 may implement an early warning and repair of the equipment by implementing the Industrial Internet of Things and the control method for fault early warning of descending equipment function disclosed in this present disclosure. For example, in a typical application scenario, when the early warning and repair of the equipment in the production line 140 need to be realized, execution status of at least one production task executed in a preset time period may be obtained first and sent to the server 110; the server 110 determines whether the equipment in the production line 140 has a descending function fault based on the execution status of the at least one production task; in response to the descending equipment function fault in the production line 140, the server 110 issues an early warning and repairs the equipment in the production line 140 accordingly, so as to ensure that the production equipment may operate normally and ensure production efficiency.

In some embodiments, the server 110 may be used to process information and/or data related to the application scenario 100. For example, the server 110 may determine whether the equipment in the production line 140 has a descending function fault, or the like based on the status of the at least one production task. In some embodiments, the server 110 may be a single server or a group of servers. The group of servers may be centralized or distributed, dedicated or provided by other devices or systems at the same time.

In some embodiments, the server 110 may be regional or remote. In some embodiments, the server 110 may be implemented on a cloud platform, or provided in a virtual fashion.

In some embodiments, the server 110 may include a processing device. The processing device may process data and/or information obtained from other devices or system components. The processing device may execute program instructions based on the data, information and/or processing results to perform one or more functions described herein.

In some embodiments, the network 120 may facilitate the exchange of information and/or data. In some embodiments, one or more components (e.g., server 110, network 120, terminal device 130, production line 140, and storage device 150) of the application scenario 100 may send the information and/or data to other components of the application scenario 100 via the network 120. For example, the server 110 may obtain information and/or data through the network 120.

In some embodiments, the terminal device 130 may be used as an electronic device for implementing data processing and data communication. For example, a mobile phone 130-1, a tablet computer 130-2, a notebook computer 130-3 or other electronic devices, which are not limited here. In some embodiments, the data and/or information obtained from the server 110 may be analyzed by the laptop computer 130-3 and displayed on the screen of the laptop computer 130-3.

In some embodiments, the production line 140 may enable streamlined production of products. In some embodiments, the production line 140 may include various smart manufacturing equipments for product manufacturing. For example, cylinder block processing equipment, cylinder block positioning and turning equipment, cam assembly installation equipment, bolt assembly installation equipment, etc. in the automobile engine assembly line.

In some embodiments, the storage device 150 is used to store data and/or instructions. In some embodiments, the storage device 150 may store information related to the production line 140. For example, the data such as the time at which the equipment in the production line 140 performs at least one production task. In some embodiments, the storage device 150 may store data and/or instructions used by the server 110 to perform the exemplary methods described in this present disclosure. In some embodiments, the storage device 150 may be implemented on a cloud platform.

In some embodiments, the storage device 150 may be connected to the network 120 to communicate with one or more components of the application scenario 100 (e.g., server 110, network 120, terminal device 130, and production line 140). One or more components of the application scenario 100 may access data or instructions stored in the storage device 150 via the network 120. In some embodiments, the storage device 150 may be directly connected or in communication with one or more components of the application scenario 100. In some embodiments, the storage device 150 may be part of the server 110.

It should be noted that the application scenario is only provided for illustrative purposes and is not intended to limit the scope of the present disclosure. Those ordinarily skilled in the art may make various modifications or changes based on the description of the present specification. For example, the application scenario may also include a database. As another example, the application scenario may be implemented on other devices to achieve similar or different functions. However, changes and modifications do not deviate from the scope of the present disclosure.

The Internet of Things system is an information processing system that includes some or all of a user platform, a service platform, a management platform, a sensor network platform, and an object platform, wherein the user platform is the leader of the entire Internet of Things system, which may be used to obtain user needs. The demand of the user is a foundation and premise of the formation of the operating system of the Internet of Things. The connection between each platform of the Internet of Things is to meet the demand of the user.

Figure 2:
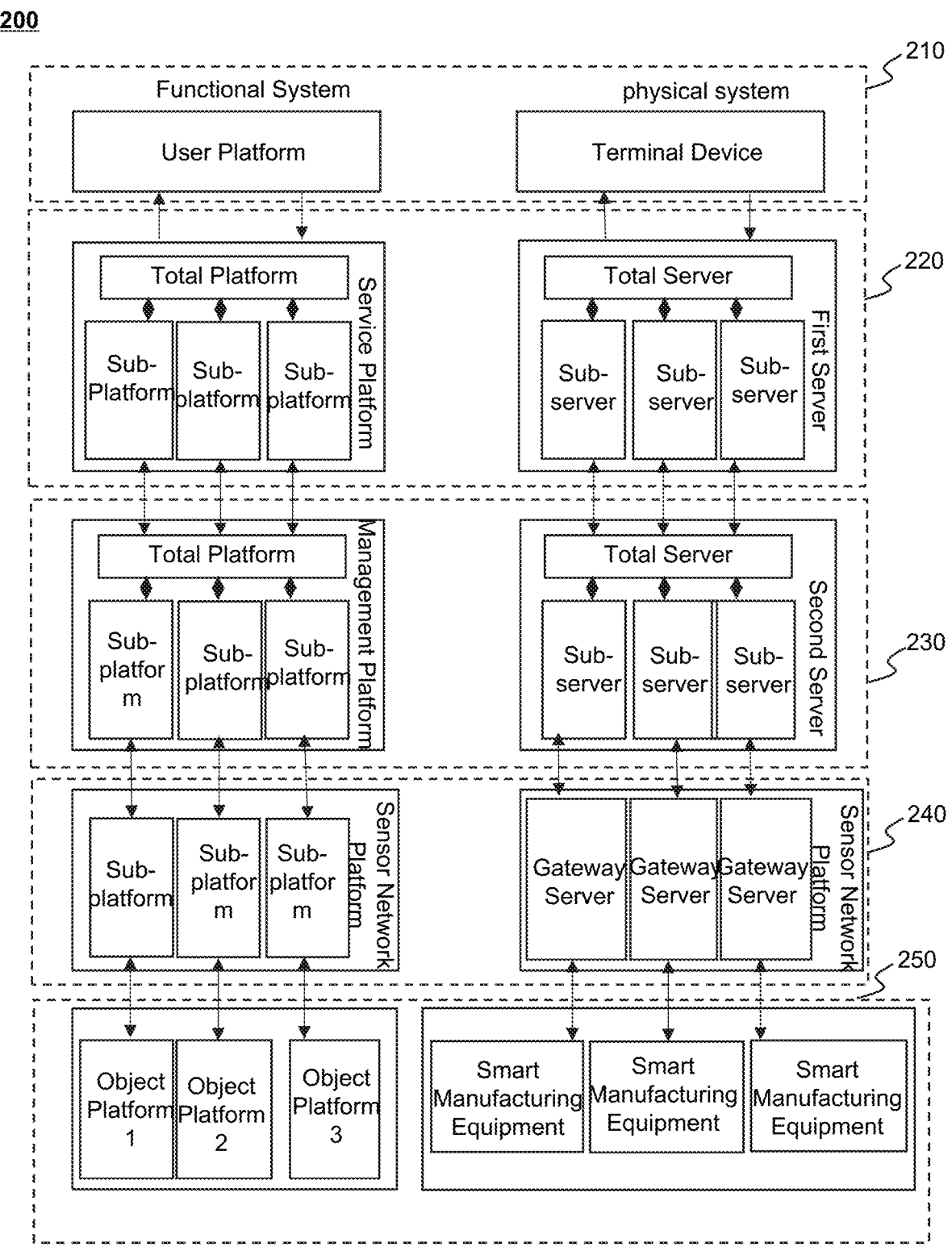
FIG. 2 is an exemplary schematic diagram illustrating a structure of the Industrial Internet of Things for fault early warning of descending equipment function according to some embodiments of the present disclosure.

FIG. 2 is an exemplary schematic diagram illustrating a structure of the Industrial Internet of Things for fault early warning of descending equipment function according to some embodiments of the present disclosure.

As shown in FIG. 2, the industrial Internet of Things system 200 for fault early warning of descending equipment function (also referred to as the system 200) may be implemented based on the Internet of Things system. The system 200 includes a user platform 210, a service platform 220, a management platform 230, a sensor network platform 240 and an object platform 250 interacting in sequence from top to bottom.

The user platform 210 may be used to interact with users. In some embodiments, the user platform 210 may be configured as a terminal device, such as a smart equipment such as a mobile phone and a computer.

The service platform 220 may be configured to receive instructions from the user platform 210 and send them to the management platform 230, and extract information needed to process the user platform 210 from the management platform 230. In some embodiments, the service platform 220 may be configured as a first server. In some embodiments, the service platform 220 adopts a front sub-platform arrangement. The front sub-platform arrangement means that the corresponding platform is provided with a total platform and multiple sub-platforms, the multiple sub-platforms store and process data of different types or different receiving objects sent by a lower platform respectively, the total platform aggregates the data of multiple sub-platforms, stores and processes it, and transmits the data to an upper platform.

In some embodiments, the service platform 220 includes a total platform of the service platform and multiple sub-platforms of the service platform. The multiple sub-platforms of the service platform respectively store and process the data of different types or different receiving objects sent by the management platform 230, the total platform of the service platform collects, stores and processes the data of the multiple sub-platforms of the service platform, and transmits the data to the user platform 210.

The management platform 230 may be used to control the operation of the object platform 250 and receive feedback data of the object platform 250. In some embodiments, the management platform 230 may be configured as a second server. In some embodiments, the management platform 230 may employ a front sub-platform arrangement. In some embodiments, the management platform 230 includes a total platform of the management platform and multiple sub-platforms of the management platform. The multiple sub-platforms of the management platform respectively store and process the data of different types or different receiving objects sent by the sensor network platform 240, the total platform of the management platform collects, stores and processes the data of the multiple sub-platforms of the management platform, and transmits the data to the service platform 220.

In some embodiments, the first server and the second server may be a single server or a server cluster, which is not limited here.

The sensor network platform 240 may be used for interaction between the object platform 250 and the management platform 230. In some embodiments, the sensor network platform 240 may be configured as a communication network and gateway. The sensor network platform 240 may use multiple groups of gateway servers or multiple groups of smart routers, which are not limited here.

In some embodiments, the sensor network platform 240 employs an independent arrangement. The independent arrangement means that the sensor network platform 240 uses different sub-platforms for data storage, data processing and/or data transmission for the data of different object platforms 250. In some embodiments, the sensor network platform 240 includes multiple sensor network sub-platforms.

The object platform 250 may be a monitoring object. In some embodiments, the object platform 250 may be configured as a smart manufacturing equipment in a production line that performs manufacturing. In some embodiments, the object platform 250 may include a number of different object platforms, such as object platform 1, object platform 2, object platform 3, or the like.

The Industrial Internet of Things for fault early warning of descending equipment function based on five platform structures, in which, both the service platform and the management platform adopt front sub-platform arrangement, the total platform of the service platform or management platform receives, analyzes and processes the data of the upper-layer platform in a unified manner, so as to facilitate the processing and classification of the data of the upper-layer platform and each sub-platform, each sub-platform corresponding to the total platform operates independently of each other, and may be divided into several independent data processing paths based on requirements, and then uses different paths for data processing and transmission for different data. In this way, the data processing pressure of the corresponding total platform may be shared, and the data processing capacity requirements of each sub-platform may be reduced, and it may also ensure the independence of each data, ensure the classified transmission, traceability of data, and classified issuance and processing of instructions, making the structure and data processing of the Internet of Things clear and controllable, and facilitating the management and control of the Internet of Things and data processing, the sensor network platform adopts an independent arrangement, which can transmit the data of different object platforms independently, ensuring that the uplink or downlink data of different object platforms are independent and do not interfere with each other during data transmission, and also facilitates efficient classification and identification of data sources based on data.

It should be noted that the above description of the system and its parts are only for the convenience of description, and does not limit the description to the scope of the illustrated embodiments. It may be understood that for those skilled in the art, after understanding the principle of the system, it is possible to arbitrarily combine the various parts, or form a subsystem to connect with other parts without departing from the principle. For example, the management platform and the service platform may be integrated in one component. As another example, each part may share one storage device, and each part may also have its own storage device. Those variations and modifications may be within the scope of the protection of one or more embodiments of the disclosure.

FIG. 3 is an exemplary flowchart illustrating a control method for the Industrial Internet of Things for fault early warning of descending equipment function according to some embodiments of the present disclosure. As shown in FIG. 3, the process 300 may include the following steps: in some embodiments, the process 300 may be performed by the management platform 230.

Step 310: obtaining execution status of at least one production task executed by the equipment within a preset time period.

The preset time period may be a certain period of time set in advance and stored in the server. For example, any time period within a day such as 00:00-02:00, 02:00-04:00, etc. The preset time period may be one or more; the multiple time periods may or may not overlap; it may be set as a fixed time interval, or may be set as any interval, which is not limited here.

The production task may be a task that the equipment in a production line needs to perform. For example, the cylinder positioning and turning equipment needs to perform the task of turning the cylinder, the cam installation assembly needs to perform the task of installing the cam assembly, and so on.

The execution status may be the status in which the equipment is performing the production task. For example, due to the failure of lubrication and the increase of friction of the cylinder turning arm in the cylinder positioning and turning equipment, the turning positioning accuracy is reduced and the positioning correction time is increased. The execution status may be obtained by various functional sensors, such as light sensor, speed sensor, displacement sensor, etc. The execution status may also be obtained by analyzing the difference in the time of single-piece manufacturing (also referred to as single-piece manufacturing time). In some embodiments, when the equipment is being manufactured, if the difference between the manufacturing times of adjacent single pieces continuously appears negative, it means that the single piece manufacturing time of the equipment continues to increase, that is, there is a problem with the equipment.

Step 320, based on the execution status of the at least one production task, determining whether the equipment has a descending function fault.

The descending function fault (also referred to as descending equipment function fault, fault of descending equipment function) is that during the manufacturing process of equipment, due to the mutual friction, external force, stress and other physical or chemical reactions of the structures within the equipment, this leads to wear, corrosion, fracture, vibration, and disengagement of some parts and components occur, resulting in the reduction of production accuracy, efficiency, stability, and safety. For example, due to the wear and tear of the assembly grasping mechanism, the cam assembly installation equipment cannot grasp the assembly well or repeatedly grasp the assembly, thereby reducing the grasping efficiency.

The descending function fault may be judged by manual inspection, sensor monitoring and other methods. For example, through the manual inspection of equipment on a regular basis, if it is found that the equipment has problems such as wear and lubrication, resulting in low production accuracy and production efficiency, it can be said that the equipment has a descending function fault.

In some embodiments, the management platform may obtain the actual time-consuming of each production task performed by the equipment, based on the actual time-consuming of each production task and the corresponding standard time-consuming, determine multiple time-consuming differences, and based on the multiple time-consuming differences, determine whether the equipment has a descending function fault.

The actual time-consuming refers to the time it takes to actually complete the production task. For example, in the manufacturing process, it takes 20 seconds for the grasping mechanism in the cam assembly installation equipment to grasp an assembly, and this 20 seconds is the actual time-consuming. The actual time-consuming may be recorded manually, or may be recorded by other methods such as server acquisition.

The standard time-consuming refers to the time it takes to complete a production task under normal operation of the equipment. For example, it only takes 10 seconds for the grasping mechanism in the cam assembly installation equipment to normally grasp a component, and the 10 seconds is the standard time-consuming. The standard time-consuming may be determined in various ways. For example, the average time value of completing a production task within a period of time may be used as the standard time-consuming, or the time specified by the user to complete a production task may be used as the standard time-consuming, or the like.

The time-consuming difference may be the absolute value of the actual time-consuming and the standard time-consuming. For example, the actual time-consuming taken by the grasping mechanism to grasp an assembly is 20 s, while the standard time-consuming is 10 s, so the time-consuming difference between the two is 10 s. The time-consuming difference may be determined in various ways. For example, using the processing equipment in the server for calculation, manual statistics, etc.

In some embodiments, the descending function fault may be determined based on a number of time-consuming differences. For example, when the number of times that the time-consuming difference exceeds the preset difference threshold exceeds a preset number of times threshold, it is considered that the equipment has a descending function fault.

Step 330, in response to the equipment having the descending function fault, issuing an early warning and repairing the equipment accordingly.

The early warning may be a warning message when an abnormal situation occurs. There are many ways of early warning, such as light warning, sound warning, etc.

The repair may be the repair of equipment to restore normal function. There are also many ways to repair. For example, faulty equipment may be repaired manually. As another example, the equipment may be self-checked and self-repaired. For example, the self-repair operation of the equipment is performed by using the self-repair instruction in the overhaul instruction in the equipment server.

In some embodiments of the present disclosure, based on the execution of at least one production task, the equipment is determined whether there is a descending function fault, and the equipment with the descending function fault is early warned and timely processed. In addition, an early warning and timely processing of descending equipment fault can ensure that the descending equipment function fault can be discovered and solved at the best time or in advance, thereby ensuring the safety and stability of the equipment, and ensuring the service life and production efficiency of the equipment.

Figure 4:
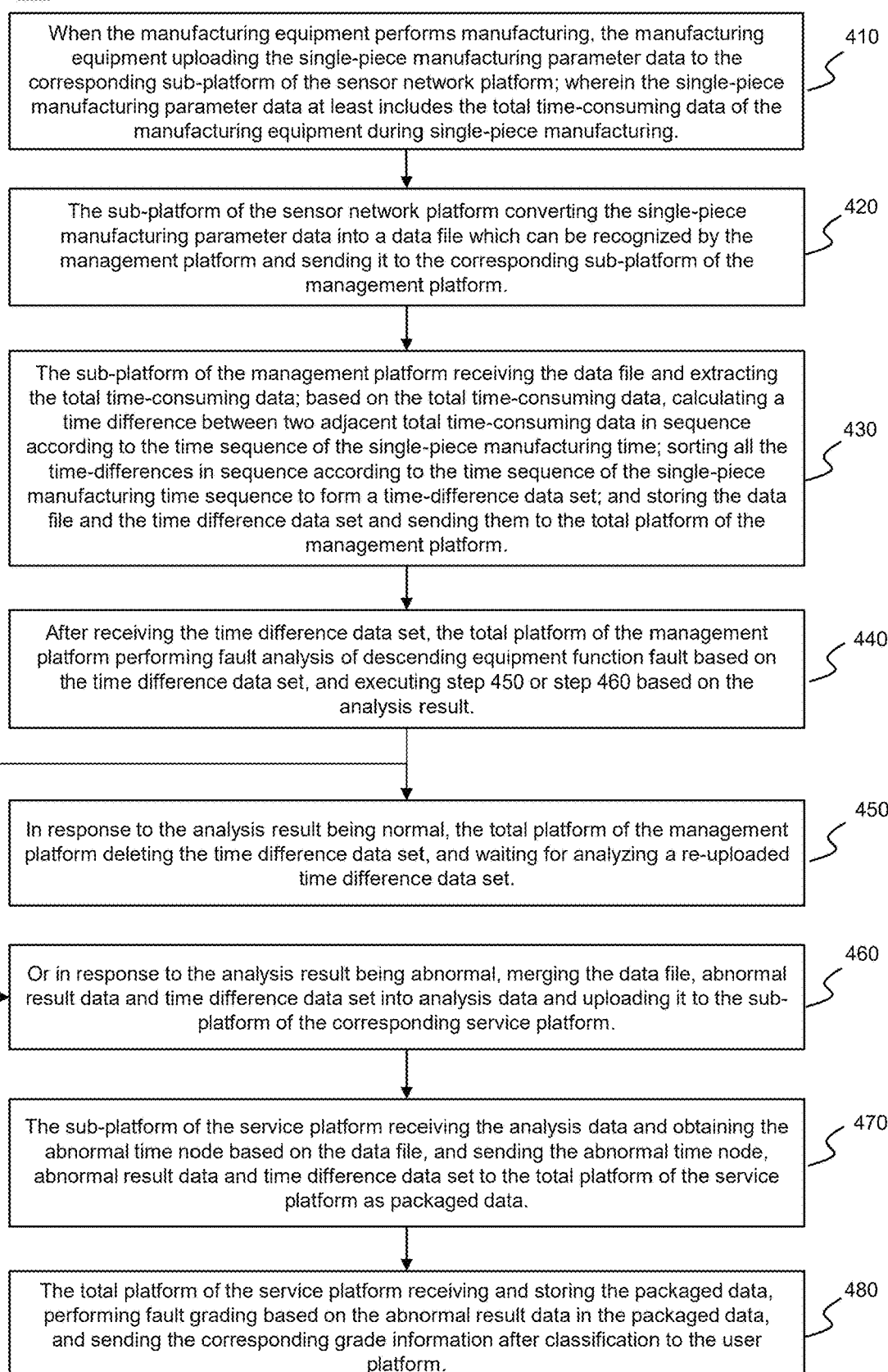
FIG. 4 is an exemplary flowchart illustrating a control method for the Industrial Internet of Things for fault early warning of descending equipment function according to some embodiments of the present disclosure.

FIG. 4 is an exemplary flowchart illustrating a control method for the Industrial Internet of Things for fault early warning of descending equipment function according to some embodiments of the present disclosure. As shown in FIG. 4, a control method for the Industrial Internet of Things for fault early warning of descending equipment function includes the following steps:

Step 410, When the manufacturing equipment performs manufacturing, the manufacturing equipment uploading the single-piece manufacturing parameter data to the corresponding sub-platform of the sensor network platform; wherein the single-piece manufacturing parameter data at least includes the total time-consuming data of the manufacturing equipment during single-piece manufacturing.

The sub-platform of the sensor network platform may use gateway server and so on. For more information about the sub-platform of the sensor network platform, please refer to FIG. 2 and its related descriptions.

Step 420, the sub-platform of the sensor network platform converting the single-piece manufacturing parameter data into a data file which can be recognized by the management platform and sending it to the corresponding sub-platform of the management platform.

The sub-platform of the management platform may be set as a sub-server of the second server, and so on. For more information about the sub-platform of the management platform, please refer to FIG. 2 and its related descriptions.

Step 430, the sub-platform of the management platform receiving the data file and extracting the total time-consuming data; based on the total time-consuming data, calculating a time difference between two adjacent total time-consuming data in sequence according to the time sequence of the single-piece manufacturing time; sorting all the time-differences in sequence according to the time sequence of the single-piece manufacturing time sequence to form a time-difference data set; and storing the data file and the time difference data set and sending them to the total platform of the management platform.

Step 440, after receiving the time difference data set, the total platform of the management platform performing fault analysis of descending equipment function fault based on the time difference data set, and executing step 450 or step 460 based on the analysis result.

In some embodiments, after the total platform of the management platform receives the time difference data set, and based on the time difference data set, performing the analysis of descending equipment function fault includes: choosing to calculate the difference between the absolute values of the two adjacent time differences in sequence according to the time sequence of single-piece manufacturing; when the difference appears negative, and the number of consecutive negative values in the difference is greater than the threshold set by the total platform of the management platform, judging that the descending equipment function fault exists, and determining the analysis result to be abnormal; otherwise, judging that the descending equipment function fault does not exist, and determining the analysis result to be normal.

In some embodiments, after the total platform of the management platform receives the time difference data set, and based on the time difference data set, performing fault analysis of descending equipment function further includes: the total platform of the management platform storing a threshold table, and each sub-platform of the management platform corresponding to a unique threshold in the threshold table; when the descending equipment function fault is analyzed, the total platform of the management platform analyzing the time difference data set of each sub-platform of the management platform, calling the corresponding threshold in the threshold value table and calculating the difference value between the corresponding threshold and the number of consecutive negative values of the difference; based on the difference calculation result: if the number of consecutive negative values in the difference value is less than the threshold, judging that the equipment is normal; if the number of consecutive negative values in the difference value is greater than the threshold, judging that the equipment is faulty, and performing fault analysis.

Step 450, in response to the analysis result being normal, the total platform of the management platform deleting the time difference data set, and waiting for analyzing a re-uploaded time difference data set.

Step 460, in response to the analysis result being abnormal, merging the data file, abnormal result data and time difference data set into analysis data and uploading it to the sub-platform of the corresponding service platform.

Step 470, the sub-platform of the service platform receiving the analysis data and obtaining an abnormal time node based on the data file, and sending the abnormal time node, abnormal result data and time difference data set to the total platform of the service platform as packaged data.

In some embodiments, the sub-platform of the service platform receives the analysis data and obtains the abnormal time node based on the data file, and sends the abnormal time node, the abnormal result data and the time difference data set as packaged data to the total platform of the service platform, specifically: the single-piece manufacturing parameter data further includes a manufacturing start time of the manufacturing equipment during single-piece manufacturing; when the manufacturing equipment uploads the single-piece manufacturing parameter data, the manufacturing equipment start time of the single-piece manufacturing is associated with the total time-consuming data and uploaded together; the sub-platform of the service platform extracts the data file after receiving the analysis data, extracts the time difference corresponding to the difference with negative values in the time difference data set, and obtains multiple corresponding total time-consuming data based on the time difference; based on the multiple total time-consuming data, multiple manufacturing start times corresponding to the multiple total time-consuming data are obtained; the abnormal time nodes are formed by sequentially ordering the multiple manufacturing start times according to the time sequence of single-piece manufacturing.

The abnormal time nodes can help to determine the time and time period when the manufacturing equipment is abnormal, and then the abnormal time nodes can be used to assist in judging the cause of the abnormality, after the user platform receives the packaged data, it can extract the abnormal time nodes and then judge the time and cause of the abnormality, so that the abnormality (or faulty) can be dealt with in a targeted manner.

Step 480, the total platform of the service platform receiving and storing the packaged data, performing fault grading based on the abnormal result data in the packaged data, and sending the corresponding grade information after classification to the user platform.

The fault grading refers to the classification of the severity of equipment fault. For example, general equipment fault in the mechanical field may be classified from low to high into mild E-level, ordinary D-level, general C-level, severe B-level, and major A-level.

In some embodiments, a fault grading method is determined for the usage of smart manufacturing equipment, specifically: among the corresponding differences of consecutive negative values, the difference with the largest absolute value is set as T1, the difference with the smallest absolute value is set as T2, the specific number of consecutive negative values is set as N, and the classification benchmark is set as F, then the classification benchmark F meets:

$$F = (T1 - T2)/N \qquad (1)$$

assuming that in the total time-consuming data in the corresponding manufacturing equipment, the allowed maximum absolute value difference is T1', and the number of allowed consecutive negative values is N',
then the allowed classification standard is F' and F'
meets:

$$F'=T1'/N' \qquad (2)$$

divide formula (1) and formula (2) to obtain the classification base Q:

$$Q=F/F'$$

when $0<Q\le0.2$, the fault is classified as ordinary D-level;
when $0.2<Q\le0.6$, the fault is classified as general C-level;
when $0.6<Q\le0.8$, the fault is classified as a severe B-level;
when $0.8<Q$, the fault is classified as a major A-level.

Each smart manufacturing equipment will have different faults according to the operating time, service life and corresponding different processing parameters and conditions, and after the fault occurs, it is generally reflected in the product manufacturing. The manufacturing equipment may assist in classifying the fault according to the product manufacturing situation. Based on this, in this embodiment, a classification benchmark in the actual manufacturing process is calculated by obtaining the corresponding difference values of consecutive negative values, then, an allowed classification benchmark allowed by the manufacturing equipment is obtained through the different consecutive negative values allowed by different manufacturing equipment. The allowed classification benchmark is considered to be the largest classification benchmark of the manufacturing equipment, that is, the allowed maximum fault level. Then, through a numerical value between the actual standard and the allowed standard, it is determined which type of fault level the actual standard corresponds to, and then accurate classification and judgment may be made for different manufacturing equipment.

In some embodiments, if the fault is classified as severe B-level or major A-level, it means that the manufacturing equipment fault has been serious, in order to avoid the hysteresis and delay in the processing of the user platform, in this embodiment, when the fault is classified as a severe B-level or a major A-level, the total platform of the service platform sends the corresponding grade information after classification to the user platform, and performs the following steps at the same time: the total platform of the service platform issues an early warning instruction based on the fault grading to the corresponding sub-platform of the service platform and the total platform of the management platform; the total platform of the management platform receives the early warning instruction and calls the early warning instruction data package based on the early warning instruction, sends the early warning instruction and the early warning instruction data package to the corresponding sub-platform of the management platform and the sub-platform of the sensor network platform, and the early warning instruction data package is stored in the total platform of the management platform; the sub-platform of the sensor network platform converts the early warning instruction and the early warning instruction data package into a configuration file which can be recognized by the object platform and sends it to the corresponding object platform; the object platform performs the early warning operation based on the configuration file.

Through the above steps, when the fault is classified as severe B-level or major A-level, the total platform of the service platform may issue early warning instructions of the corresponding level in advance to the user platform and perform corresponding early warning operations, such as alarming, remote warning, etc., therefore, corresponding early warning processing may be carried out in advance, and further fault processing may be carried out in advance or the hysteresis of fault processing can be reduced.

In some embodiments, after the user platform obtains the grade information, based on the grade information, the user platform sends an overhaul instruction to the total platform of the service platform, and the overhaul instruction at least includes one self-repair sub-instruction; the total platform of the service platform receives the overhaul instruction and analyzes the instruction based on the overhaul instruction, obtains at least one self-repair sub-instruction, and sends the at least one self-repair sub-instruction to the corresponding sub-platform of the service platform; the sub-platform of the service platform receives the self-repair sub-instruction and sends the self-repair sub-instruction to the total platform of the management platform; the total platform of the management platform receives the self-repair sub-instruction, obtains the corresponding instruction code data package, associates the instruction code data package with the self-repair sub-instruction and sends it to the sub-platform of the management platform together; the instruction code data package is pre-stored in the total platform of the management platform; the sub-platform of the management platform receives the instruction code data package and the self-repair sub-instruction and sends them to the sub-platform of the corresponding sensor network platform; the sub-platform of the sensor network platform converts the instruction code data package and the self-repair sub-instruction into a configuration file that can be recognized by the object platform and sends it to the corresponding object platform, the object platform executes self-repair based on the self-repair sub-instruction calling the instruction code data in the instruction code data package.

In some embodiments, after obtaining the grade information, the user platform may issue some instructions in advance according to the fault level to eliminate or assist in eliminating exceptions and faults. For example, due to the error of the control system of the manufacturing equipment, the manufacturing equipment may need to perform multiple actions to complete due to precision problems in grasping parts, positioning parts and assembly, resulting in an increase in the manufacturing time of a single piece, such faults are generally low-level faults, and may be automatically handled through equipment self-check and self-repair, without further fault processing.

In some embodiments, when the overhaul instruction corresponds to different execution times, the total platform of the service platform writes the execution time into the corresponding self-repair sub-instruction after analyzing; after the target platform retrieves the instruction code data in the instruction code data package based on the self-repair sub-instruction, it executes the self-repair at the corresponding execution time, so as to reduce the task of the manufacturing equipment and affect the product manufacturing.

In some embodiments of this present disclosure, by classifying equipment faults and giving early warning, fault processing may be performed in advance, so as to avoid the severity of faults. At the same time, based on the fault grade information, the self-repair instruction is issued in advance to make the device take the initiative to self-repair, which can reduce the complexity and time of fault processing and reduce the impact of fault processing on production efficiency.

FIG. 5 is an exemplary flowchart illustrating a process 500 for determining fault of descending equipment function based on qualifications according to some embodiments of the present disclosure. The process 500 is hereinafter referred to as the process 500. As shown in FIG. 5, the process 500 may include the following steps.

It should be noted that the process 500 may be applied to various scenarios of fault early warning for descending equipment function. In some embodiments, the process 500 may be applied to an auto parts production line, for example, an auto engine parts production line, an auto brake system parts production line, an electrical instrument parts production line, or the like. The management platform may determine the actual qualified rate of each production task based on the rate of qualified parts of the auto parts produced in at least one production task of the auto parts production equipment. The management platform further conducts a comparative analysis based on the actual qualified rate of multiple production tasks and the preset standard qualified rate to determine multiple qualifications (or qualified degree) of the corresponding auto parts production equipment, and based on the multiple qualifications, determines whether there is a descending function fault in the production equipment.

For those skilled in the art, after understanding the principle of the system, it is possible to move the system to any other suitable scene without departing from this principle.

The process 500 will be specifically described below by taking a food production scenario as an example.

Step 510: determining an actual qualified rate of each production task in the at least one production task based on the rate of qualified food in the output food of the at least one production task.

The qualified food may refer to the food produced in the production task that meets various preset indicators. For example, the food produced meets the requirements of indicators such as length, shape, volume, color, and taste. In some embodiments, the preset indicators may include parameters such as an expansion degree and a shape of the product.

The qualified rate may refer to the proportion of the qualified food in the food produced by a certain production task of the equipment to the total quantity. For example, the qualified rate is 0.95.

The management platform may determine the actual qualified rate of the corresponding production task based on the qualified rate of at least one production task within a certain period of time (e.g., a preset production cycle). For example, the qualified rate of each production task in one production cycle is taken as the actual qualified rate of the production task.

In some embodiments, the management platform may determine whether the produced food is qualified food through the corresponding relationship between the produced food and each indicator of the standard food. For example, by presetting various standard food data tables, the management platform may determine whether the produced food is qualified food by comparing and analyzing various indicators of the actual food produced with the indicators in the data table.

In some embodiments, whether a produced food product is qualified is related to expansion degree compliance degree and shape compliance degree of the produced food product. The management platform may perform image recognition on the output food, and determine the expansion degree compliance degree and shape compliance degree of the output food based on the images of the output food and the standard food. For example, the management platform may determine whether the expansion degree and shape of the produced food meet the standard requirements by comparing and analyzing the real-time image of the produced food obtained by the camera equipment and the preset standard image of the produced food, so as to further determine whether the produced food is qualified food.

The expansion degree compliance degree may refer to the degree to which the rate of the volume of the produced food to the volume of the standard food meets the requirements. When the expansion degree compliance degree is closer to 1, it means that the volume of the produced food is more in line with the volume of the standard food. In some embodiments, the range of the expansion degree compliance degree may be preset, such as the interval [0.9, 1.2], when the expansion degree compliance degree of the produced food is within this range, such as 0.95, it means that the expansion degree compliance degree of the produced food meets the preset requirements.

The shape compliance degree may refer to the compliance degree of a shape of an output food product with a shape of a standard output food product. For example, the standard shape of the snow rice cake should be a circle. When the actual shape of the snow rice cake is a rectangle, it may be considered that the shape compliance degree is low.

In some embodiments, the management platform may determine the expansion degree compliance degree and shape compliance degree of the produced food based on a first image recognition model.

The first image recognition model may refer to a model used to determine the expansion degree compliance degree and shape compliance degree of the produced food and then judge whether the produced food is qualified. The first image recognition model may be a trained machine learning model. For example, any one or combination of convolutional neural networks, deep neural network models, or other custom model structures, etc.

In some embodiments, the first image recognition model may include a feature extraction layer and a judgment layer. The feature extraction layer may include two convolutional neural network models for extracting the food features of the real-time images of the produced food and the food features of the standard images, respectively, wherein, the two convolutional neural network models have the same initial parameters, and the parameters are shared. The judgment layer may be a deep neural network model, which is used to determine the expansion degree compliance degree and shape compliance degree of the produced food, and then judge whether the produced food is qualified.

In some embodiments, the management platform may obtain the real-time image of the produced food in the production task and the preset standard image of the produced food through the camera device, and input them into the first image recognition model, the two convolutional neural network models process the real-time image and the standard image respectively based on the feature extraction layer, and output the output food feature vector and the standard food feature vector respectively. The food feature vector may be used to represent the expansion degree (such as length, width, height characteristics, etc.) and shape (such as contour, area) features of the food.

Further, the management platform inputs the output food feature vector and the standard food feature vector to the judgment layer, and processes the above two food feature vectors through the judgment layer. For example, the judgment layer may calculate the vector distance (such as Euclidean distance) of the food feature vector between the output food and the standard food. When the vector distance is less than the preset threshold, it means that the similarity between the output food and the standard food meets the preset requirements, so it is determined that the expansion degree and shape of the output food meet the standard requirements, and the output food is determined to be qualified food. As another example, the judgment layer may also compare the expansion degree and shape features of the output food with the expansion degree and shape features of the standard food respectively, so as to output the expansion degree compliance degree and shape compliance degree of the output food, then, based on whether the expansion degree compliance degree and shape compliance degree of the produced food meet a preset condition, the management platform then judges whether the produced food is qualified food.

In some embodiments, the first image recognition model may be obtained through joint training of the feature extraction layer and the judgment layer. The training samples may be multiple sets of images of food produced for historical production tasks, as well as corresponding standard images of food. The labels of the training samples may be set based on the output of the first image recognition model, then the labels of the training samples may be the actual expansion degree compliance degree and shape compliance degree of the food produced by the historical production task. As another example, if the model needs to directly output the judgment result of whether the product is qualified food, the label of the training sample may be the result of whether the output food corresponding to the historical output image is qualified. The labels may be based on human annotations.

The following takes the label as an example of whether the output food corresponding to the historical output image is qualified. The label may be 1 or 0, 1 means qualified, 0 means unqualified. During training, the management platform may establish a loss function based on the labels of the training samples and the results output by the judgment layer, and update the parameters of the model. The two convolutional neural network models of the feature extraction layer may be updated synchronously. The management platform iteratively updates the parameters of the first image recognition model based on the loss function, until the training is completed when the preset condition is met, and the trained first image recognition model is obtained. The preset condition may be that the loss function is less than the threshold, convergence, or the training cycle reaching a threshold.

In some embodiments of this present disclosure, the real-time image of the produced food and the image of the standard food are processed by the first image recognition model, it helps to quickly confirm whether the expansion degree compliance degree and shape compliance degree of the produced food meet the preset requirements, thereby improving the judgment efficiency of whether the produced food is qualified food.

In some embodiments, whether the produced food is qualified is also related to the uniformity of the feeding per unit area of the produced food. For example, the management platform may determine the uniformity of the produced food based on the conditions of different areas of the produced food (such as appearance, color, etc.), and then judge whether the produced food is qualified.

The feeding may refer to the operation of adding a certain amount of food accessories in the process of producing a certain type of food. For example, to produce chips, it is necessary to add a preset amount of tomato powder and/or other auxiliary materials on the surface of the chips.

The degree of uniformity may refer to the degree of uniformity of the accessories on the unit area of the food during the production process. Exemplarily, when the degree of uniformity is low, that is, when the difference in the amount of material in different regions of the food is large, the color of the region with a large amount of material may be concentrated and close to the color of the accessories, the color of the area with a small amount of material may be closer to the color of the output product itself. The degree of uniformity may be a value in the range of [0-1], such as 0.8, the larger the value, the more uniform it is. The uniformity threshold may be preset, such as 0.7. When the uniformity of the produced food is greater than the threshold, it means that the produced food meets the uniformity requirement.

In some embodiments, the management platform may determine the uniformity of the produced food based on the second image recognition model, and then determine whether the produced food is qualified based on the uniformity of the produced food.

The second image recognition model can refer to a model that is used to determine the uniformity of output food and then determine whether the food output is qualified. The second image recognition model may be a trained machine learning model.

In some embodiments, the second image recognition model may comprise a convolutional neural network model. It is used to extract the color distribution features of different regions of the produced food in the real-time image to determine the uniformity of the produced food. The management platform may obtain the real-time image of the food produced in the production task through the camera device, and input it to the second image recognition model, process the real-time image through the second image recognition model, and output the uniformity of the produced food.

In some embodiments, the second image recognition model may be obtained through training. The training samples may be multiple sets of images of the food produced for the historical production task. The labels of the training samples may be the uniformity of the output food corresponding to the historical output image, such as 0.5, etc. The training labels may be manually labeled. During training, the management platform may establish a loss function based on the labels of the training samples and the output of the second image recognition model, and update the parameters of the model, and based on the loss function, the parameters of the second image recognition model are iteratively updated until the preset condition is met and the training is completed, and the trained second image recognition model is obtained. The preset condition may be that the loss function is less than the threshold, convergence, or the training cycle reaching a threshold.

In some embodiments of this present disclosure, the real-time image of the produced food is processed by the second image recognition model, which is helpful to quickly and in real time to confirm whether the uniformity of the produced food meets the preset requirements, thus, the efficiency of judging whether the produced food is qualified food is improved, and the consumption of time and energy caused by manual analysis is reduced.

Step 520: determining multiple qualifications of the equipment based on the actual qualified rate and the corresponding standard qualified rate of each production task.

The standard qualified rate may refer to a preset qualified rate. The standard qualified rate may be determined based on production experience such as a type of food, production difficulty, etc. For example, 0.95 may be preset as the standard qualified rate.

The qualification refers to a degree to which a qualified rate of a production task meets a requirement. For example, if the standard qualified rate is 0.95, if the actual qualified rate of a production task is 0.95 and above, it is considered that the qualified rate meets the requirement, and a corresponding qualified rate of the production task may be 1; if the actual qualified rate of the production task is lower than 0.95, it is considered that the qualified rate does not meet the requirement, and the corresponding qualified degree of the production task is also reduced accordingly.

The qualification may be determined by various calculations. For example, the qualification may be determined through the ratio of the actual qualified rate to the standard qualified rate. If the actual qualified rate of the production task is 0.92 and the standard qualified rate is 0.95, it may be considered that the qualified rate of the production task is 0.92/0.95=0.968.

Step 530, based on the multiple qualifications, determining whether the equipment has the descending function fault.

In some embodiments, the management platform may obtain qualifications of multiple production tasks of the equipment, and then obtain the multiple qualifications of the equipment, and determine whether the equipment has a descending function fault based on the multiple qualifications. For example, a qualification threshold may be preset, and the management platform may calculate an average value of the multiple qualifications. When the average value is less than the preset qualification threshold, it is determined that the equipment has a descending function fault.

In some embodiments, the management platform may determine whether the equipment has a probability of a descending function fault through a fault probability prediction model. For more explanations, please refer to FIG. 6 and its related descriptions.

It is of practical significance to consider the output quality of the production equipment to judge whether there is a descending function fault of the production equipment by introducing the qualification of the output food. In addition, using the second image recognition model to determine whether the product is qualified can help improve the speed of judging food quality, improve the efficiency of judging whether there is a descending function fault of the equipment, and reduce the cost of manual inspection.

Figure 6:
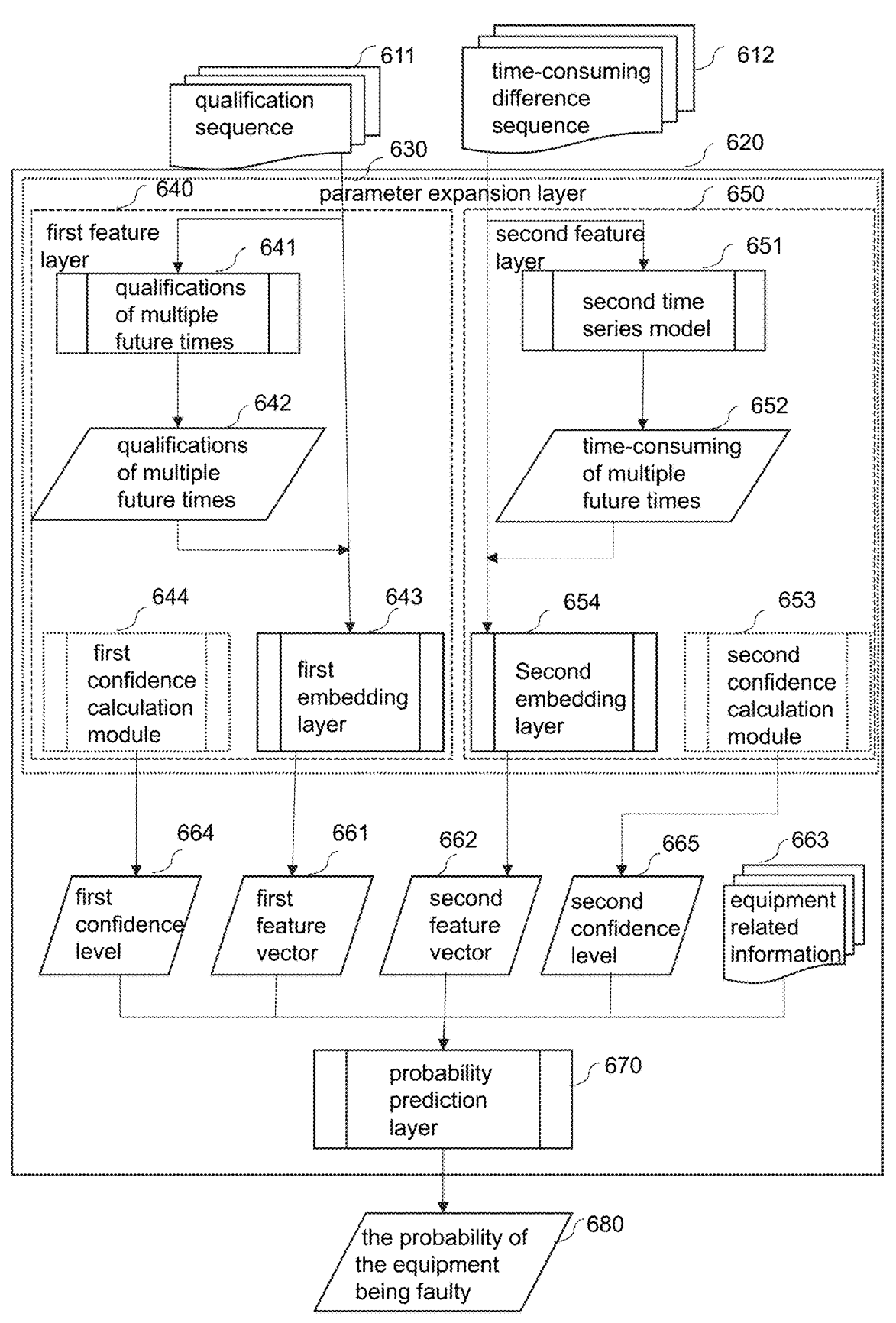
FIG. 6 is an exemplary schematic diagram illustrating an application of a fault probability prediction model according to some embodiments of the present disclosure.

FIG. 6 is an exemplary schematic diagram illustrating an application of a fault probability prediction model according to some embodiments of the present disclosure.

In some embodiments, the management platform may predict a fault probability through the fault probability prediction model 620, which is a machine learning model. For example, a circulating neural network model, a convolutional neural network or other custom model structure, or the like, or any combination thereof.

The fault probability prediction model 620 may refer to a model for predicting a probability that a device has a descending function fault. In some embodiments, the fault probability prediction model 620 includes a parameter expansion layer 630 and a probability prediction layer 670.

The parameter expansion layer 630 may refer to a processing layer for processing an equipment-related feature. For example, the parameter expansion layer 630 may be used to process a qualification feature of a food produced by the equipment, a time-consuming feature of the equipment to perform a production task, or the like.

In some embodiments, the parameter expansion layer 630 may include a first feature layer 640. The first feature layer 640 may include a first time series model 641 and a first embedding layer 643. The first time series model 641 may be a long short-term memory network model, and the first embedding layer 643 may be a deep neural network model.

In some embodiments, the management platform may input a qualification sequence 611 to the first feature layer 640, process the qualification sequence 611 through the first feature layer 640, and output the first feature vector 661.

The qualification sequence 611 may refer to a sequence formed by chronologically arranging qualifications of multiple historical production tasks of the equipment up to a current time. For example, (0.9, 0.9, 0.6) represents a sequence formed by qualifications of three historical times (e.g., T1, T2, T3) up to the current time, which may be represented by a vector. The qualification sequence 611 may be obtained based on the performance of the historical multiple production tasks of the equipment through the management platform.

The first feature vector 661 may refer to a vector representation of a qualification feature. The first feature vector 661 includes qualifications at multiple times in history and predicted qualifications of multiple future times. For example, the first feature vector 661 formed by the qualifications of the three historical times T1, T2, T3 and the future two times T4 and T5 is (0.9, 0.9, 0.6, 0.94, 0.92).

The first time series model 641 may refer to a model for predicting qualifications of multiple future times. In some embodiments, the first time series model may process the qualification sequence 611 input by the management platform to the first feature layer 640 to output qualifications 642 at multiple future times. For example, based on a qualification degree sequence of the three historical times T1, T2, and T3, the qualification degrees of 0.94 and 0.92 at the next two times T4 and T5 are output. It should be noted that the qualification degrees 642 of multiple future times may also be in the form of a chronological sequence.

The first embedding layer 643 may refer to a processing layer for processing the qualification sequence 611 and the qualifications 642 of multiple future times. In some embodiments, the first embedding layer 643 inputs the qualification sequence 611 and the qualifications 642 of multiple future times, and outputs the first feature vector 661.

In some embodiments of the present disclosure, by using a predicted qualification as an input of the subsequent probability prediction layer to predict a probability of a descending function fault, a number of actual tests of the equipment may be reduced, and the test cost may be reduced, at the same time, the prediction accuracy of the probability prediction layer is increased.

The probability prediction layer 670 may refer to a processing layer for predicting the probability that the equipment has a descending function fault. The probability prediction layer 670 may be a deep neural network model.

In some embodiments, the management platform inputs the first feature vector 661 and the equipment information 663 of the equipment to the probability prediction layer 670, the probability prediction layer 670 processes the first feature vector 661 and the equipment information 663, and outputs the probability 680 of the equipment being faulty.

In some embodiments, the management platform may input the qualification sequence 611 into the fault probability prediction model 620, process the qualification sequence 611 through the first feature layer 640 of the parameter expansion layer 630, and output the first feature vector 661. The first feature vector 661 is used as the input of the probability prediction layer 670, and the probability prediction layer 670 processes the first feature vector 661 and the device information 663, and outputs the probability 680 of the equipment being faulty. In some embodiments, the probability threshold may be preset, such as 0.7. In response to the probability 680 of the equipment being faulty output by the fault probability prediction model 620 being greater than the preset probability threshold, it is determined that a corresponding equipment has a descending function fault.

In some embodiments, the fault probability prediction model 620 may be obtained through training. The training samples include multiple sets of historical qualification sequences. The multiple sets of training samples may be obtained from historical production data. For example, the training sample may be a qualification sequence consisting of qualifications for several consecutive production tasks over the past year of the equipment. The labels of the training samples may be the equipment fault conditions corresponding to each set of samples. The labels may be manually labelled or labelled in other feasible ways. For example, 0 indicates that the equipment has a fault, and 1 indicates that the equipment does not have a fault. The management platform may input the multiple qualification sequences 611 in the training samples into the fault probability prediction model 620, a loss function is constructed based on the output and labels of the fault probability prediction model 620, and parameters of the initial first time series model 641, the first embedding layer 643 and the probability prediction layer 670 are iteratively updated simultaneously based on the loss function, until a preset condition is met and the training is completed, a trained fault probability prediction model 620 is obtained. The preset condition may be that the loss function is less than a threshold, a convergence, or the training cycle reaching the threshold.

In some embodiments, the fault probability prediction model 620 may also include a second feature layer 650. The second feature layer 620 may include a second time series model 651 and a second embedding layer 654. The second time series model 651 may be a long short-term memory network model, and the second embedding layer 654 may be a deep neural network model.

In some embodiments, the management platform may input the time-consuming sequence 612 into the second feature layer 650, process the time-consuming sequence 612 through the second feature layer 650, and output the second feature vector 662.

The time-consuming difference sequence 612 may refer to a sequence constructed according to time sequences of time-consuming differences of multiple historical production tasks up to the current time. For example, (0 s, 0 s, 0 s, 1 s, 0 s) represents the time-consuming difference sequence of 5 historical production tasks up to the current time, which may be represented by a vector. The time-consuming difference sequence may be obtained based on time-consuming situations of multiple historical production tasks of the equipment through the management platform. For the description of the time-consuming difference, please refer to FIG. 3 and its related descriptions.

The second feature vector 662 may refer to a vector representation of a time-consuming difference feature. The second feature vector includes time-consuming differences of multiple historical production tasks and predicted time-consuming differences of multiple production tasks in the future. For example, the second feature vector formed by time-consuming differences between five historical production tasks and three future production tasks is (10 s, 1 s, 0 s, 0 s, 0 s, 2 s, 3 s, 0 s). The first five time-consuming differences are the time-consuming differences of five historical production tasks.

The second time series model 651 may refer to a model for predicting the time-consuming differences of production tasks of multiple future times. In some embodiments, the second time series model 651 may process the time-consuming sequence 612 input by the management platform to the second feature layer 650, and output the time-consuming 652 of multiple future times. For example, based on the time-consuming difference sequence (10 s, 1 s, 0 s, 0 s, 0 s) of the above five historical times T1, T2, T3, T4, and T5, output the time-consuming differences (2s, 3 s, 0 s).

The second embedding layer 654 may refer to a processing layer for processing the time-consuming sequence 612 and the time-consuming 652 of multiple future times. In some embodiments, the management platform may input the time-consuming difference sequence 612 and the time-consuming differences 652 of multiple future times to the second embedding layer 654, and through the processing of the second embedding layer 654, output the second feature vector 662.

In some embodiments, in response to the fault probability prediction model 620 including the second feature layer 650, the input of the probability prediction layer 670 further includes the second feature vector 662 output by the second feature layer 650. The probability prediction layer 670 may process the first feature vector 661, the second feature vector 662 and the equipment related information 663, and output the probability 680 of the equipment being faulty.

In some embodiments of the present disclosure, by introducing the historical time-consuming differences of production tasks and the predicted future time-consuming difference data to predict the probability of descending equipment function fault, the accuracy of the prediction may be improved.

In some embodiments, the output of the first feature layer 640 further includes a first confidence level 664, and the output of the second feature layer 650 further includes a second confidence level 665. Correspondingly, the input of the probability prediction layer 670 further includes the first confidence level 664 and the second confidence level 665.

The first confidence level may refer to a confidence level of the qualifications 642 of the predicted multiple future times. The first confidence level may be represented as a numerical value in a (0, 1) interval, such as 0.8, the larger the numerical value is, the higher the confidence level is. It can be understand that when the predicted future time is farther from the current time, the confidence level is lower.

In some embodiments, the first feature layer 640 may further include a first confidence calculation module 644. The first confidence level 664 may be obtained through calculation by the first confidence level calculation module 644. The calculation method may be determined based on a relationship between the qualification sequence 611 and the number of qualifications predicted at a future time. For example, a preset calculation formula: first confidence level=qualification sequence dimension (qualification sequence dimension+number of qualifications in the future). Exemplarily, the qualification sequence dimension is 5, and the number of qualifications at the future time to be predicted is 3, that is, the qualifications of 3 production tasks in the future time are predicted by the first time series model based on 5 historical data, then the first confidence level=5/(5+3)=0.625. It should be noted that the execution of each production task has a corresponding production cycle. When the number of qualifications for predicting future times is larger, it indicates that the predicted future time span is larger, and the corresponding first confidence level is lower. On the other hand, when the number of historical qualifications used is more, it means that the data is more fully supported, and the corresponding first confidence level is higher.

The second confidence level may refer to a confidence level of the predicted time-consuming differences of multiple future times. The second confidence level may be represented as a numerical value within a (0, 1) interval, such as 0.8, and a larger numerical value indicates a higher confidence level. It can be understand that when the predicted future time is farther from the current time, the confidence level is lower.

In some embodiments, the second feature layer 650 may further include a second confidence calculation module 653. The second confidence level 665 may be obtained based on the second confidence level calculation module 653. The calculation method may be determined based on a relationship between a dimension of the time-consuming difference sequence and the number of time-consuming differences predicted at future times. For example, a preset calculation formula: second confidence level=dimension of time-consuming difference sequence/(time-consuming difference sequence dimension+number of time-consuming differences at future times). The calculation method of the first confidence is the same, and details are not repeated here.

In some embodiments of the present disclosure, when predicting the probability of descending equipment function fault, the influence of the qualification data and the confidence degree of the time-consuming difference data can be considered, so that the accuracy of the prediction can be further improved.

In some embodiments, the fault probability prediction model 620 may be obtained through a joint training of the parameter expansion layer 630 and the probability prediction layer 670. The training samples include the qualification sequences 611 of multiple sets of historical production tasks, and the time-consuming difference sequences 612 of the production tasks corresponding to each set of qualification sequences 611.

The management platform may input the multiple sets of qualification sequences 611 and time-consuming difference sequences 612 in the training samples to the parameter expansion layer 630. The qualification sequences 611 are input to the first feature layer 640, while the time-consuming difference sequences 612 are input to the second feature layer 650.

In the processing in the first feature layer 640, the qualification sequence 611 is input to the first time series model 641, and the qualifications 642 of multiple future times are output; The qualifications 642 and the qualification sequence 611 of multiple future times are used as the input of the first embedding layer 643, and the first feature vector 661 is obtained through the processing of the first embedding layer 643, at the same time, the first confidence level calculation module 644 obtains the first confidence level 664 through a preset calculation formula based on the qualification degrees 642 and the qualification degree sequence 611 of multiple future times.

At the same time, in the processing in the second feature layer 650, the time-consuming difference sequence 612 is input to the second time series model 651, and the time-consuming differences 652 of multiple future times is output; the time-consuming differences 652 and the time-consuming difference sequences 612 of multiple future times are used as the input of the second embedding layer 653, and the second feature vector 662 is obtained through the processing of the first embedding layer 643, at the same time, the second confidence level calculation module 653 obtains the second confidence level 665 by using a preset calculation formula based on the time-consuming differences 652 and the time-consuming difference sequences 612 of multiple future times.

Further, the management platform uses multiple sets of first feature vectors 661 and first confidence levels 664 output from the first feature layer 640 and multiple sets of second feature vectors 662 and second confidence levels 665 output from the second feature layer as the training sample data of the probability prediction layer 670, meanwhile, the training samples of the probability prediction layer 670 also include equipment-related information 663.

The management platform inputs the training samples of the above-mentioned sets of probability prediction layers 670 into the probability prediction layer 670, and constructs a loss function based on the output and labels of the probability prediction layer 670, simultaneously iteratively updates the parameters of the initial first feature layer 640, the initial second feature layer 650 and the probability prediction layer 670 based on the loss function. The parameter update of the first feature layer 640 includes updating the parameters of the first time series model 641 and the first embedding layer 643; the parameter update of the second feature layer 650 includes updating the parameters of the second time series model 651 and the second embedding layer 653. The termination condition of the parameter iterative update may be that the preset condition is met, the training is completed, the trained first feature layer 640, the second feature layer 650, and the probability prediction layer 670 are obtained, and finally the fault probability prediction model 620 is obtained. The preset condition may be that the loss function is less than a threshold, a convergence, or the training cycle reaching the threshold.

The fault probability prediction model 620 is obtained through a joint training of the parameter expansion layer 630 and the probability prediction layer 670, which helps to reduce the complexity of obtaining training samples and improve the training efficiency.

In some embodiments of the present disclosure, a fault probability prediction model is used to predict a descending function fault of the equipment, which is helpful for early warning and early prevention of equipment that may have a descending function fault.

This present disclosure provides an industrial Internet of Things for fault early warning of descending equipment function and its control method. It builds the Industrial Internet of Things based on a five-platform structure, and adopts a platform arrangement method that combines front sub-platform arrangement and independent arrangement, which can ensure the independence of data transmission and facilitate the classification and processing of data. By classifying the descending function faults of equipment, and based on the fault grading situation, the total platform of the service platform can issue fault processing instructions by itself, which can give early warning of equipment faults to ensure the normal operation of the production line, thereby achieving the purpose of ensuring production efficiency.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An Industrial Internet of Things for early warning of descending function fault of equipment, comprising a management platform, a user platform, a service platform, a sensor network platform, and an object platform, wherein
the user platform, the service platform, the management platform, the sensor network platform, and the object platform interacting in sequence from top to bottom,
the user platform is configured as a terminal device,
the service platform is configured as a first server cluster,
the management platform is configured as a second server cluster,
the sensor network platform is configured as multiple groups of gateway servers or multiple groups of smart routers,
the object platform is configured as a smart manufacturing equipment in a production line that performs manufacturing,
the first server cluster includes a first total server and multiple first sub-servers,
the second server cluster includes a second total server and multiple second sub-servers,
both the service platform and the management platform adopt a front sub-platform arrangement, and the sensor network platform adopts an independent arrangement; the front sub-platform arrangement means that the corresponding platform is provided with a total platform and multiple sub-platforms, the multiple sub-platforms store and process data of different types or different receiving objects sent by a lower platform respectively, the total platform aggregates, stores, and processes data of multiple sub-platforms, and transmits the data to an upper platform, the independent arrangement means that the sensor network platform uses different sub-platforms for data storage, data processing and/or data transmission for data of different object platforms,
the total platform is configured as the first total server or the second total server,
the multiple sub-platforms are configured as the multiple first sub-servers or the multiple second sub-servers; and
the management platform is configured to perform following operations including:
obtaining execution status of at least one production task executed by the equipment in a preset time period;
based on the execution status of the at least one production task, judging whether the equipment has a descending function fault, including:
obtaining, by a sub-platform of the management platform, a recognizable data file corresponding to a single-piece manufacturing parameter from a sub-platform of the sensor network platform, wherein the single-piece manufacturing parameter at least includes total time-consuming data of the manufacturing equipment during single-piece manufacturing, the single-piece manufacturing parameter is uploaded to a corresponding sub-platform of the sensor network platform by the sub-platform of the sensor network platform, the recognizable data file refers to a data file that the management platform recognizes, and the recognizable data file is obtained by converting the single-piece manufacturing parameter data based on the sub-platform of the sensor network platform;

extracting, by the sub-platform of the management platform, the total time-consuming data based on the recognizable data file;

calculating, by the sub-platform of the management platform, a time difference between two adjacent total time-consuming data in sequence according to a time sequence of the single-piece manufacturing based on the total time-consuming data;

sorting, by the sub-platform of the management platform, all time differences in sequence according to the time sequence of the single-piece manufacturing to form a time difference data set;

sending, by the sub-platform of the management platform, the recognizable data file and the time difference data set to the total platform of the management platform;

after receiving the time difference data set, analyzing, by the total platform of the management platform, on descending function fault based on the time difference data set, and when an analysis result is normal, deleting the time difference data set and waiting for the analysis of a re-uploaded time difference data set by the total platform of the management platform; or when the analysis result is abnormal, merging the recognizable data file, abnormal result data, and the time difference data set into analysis data, and uploading the analysis data to a corresponding sub-platform of the service platform by the total platform of the management platform;

in response to the equipment having the descending function fault, issuing an early warning and repairing the equipment, including:

receiving, by the total platform of the management platform, a self-repair sub-instruction from the corresponding sub-platform of the service platform; and obtaining, by the total platform of the management platform, an instruction code data package corresponding to the self-repair sub-instruction, wherein the instruction code data package is pre-stored in the total platform of the management platform, the self-repair sub-instruction is sent by the total platform of the service platform, the self-repair sub-instruction is determined based on an overhaul instruction by the total platform of the service platform, the overhaul instruction is sent by the user platform, the overhaul instruction is determined based on grade information by the user platform, the grade information is determined based on abnormal result data of packaged data by the total platform of the service platform, the packaged data is sent by the corresponding sub-platform of the service platform, the packaged data includes an abnormal time node, the abnormal result data, and the time difference data set, and the abnormal time node is obtained based on the recognizable data file by the corresponding sub-platform of the service platform;

associating, by the total platform of the management platform, the instruction code data package with the self-repair sub-instruction and sending, by the total platform of the management platform, the instruction code data package and the self-repair sub-instruction to the sub-platform of the management platform; and sending, by the sub-platform of the management platform, the instruction code data package and a recognizable configuration file corresponding to the self-repair sub-instruction to a corresponding object platform through the sub-platform of the sensor platform, wherein the self-repair sub-instruction is configured to cause the corresponding object platform to execute self-repair at execution time by calling the instruction code data in the instruction code data package based on the self-repair sub-instruction, the recognizable configuration file refers to a configuration file that is recognized by the corresponding object platform, the recognizable configuration file is obtained by converting the self-repair sub-instruction based on the sub-platform of the sensor platform, and the execution time is determined by the total platform of the service platform based on the overhaul instruction corresponding to different execution times.

2. The Industrial Internet of Things of claim 1, wherein after the total platform of the management platform receives the time difference data set, and the total platform of the management platform performing analysis on descending function fault based on the time difference data set includes:

after the total platform of the management platform receives the time difference data set, the total platform of the management platform choosing to calculate a difference between absolute values of two adjacent time differences in sequence according to the time sequence of single-piece manufacturing;

when the difference is negative, and the number of consecutive negative values of the difference is greater than a threshold set by the total platform of the management platform, the total platform of the management platform determining that the descending function fault exists, and determining the analysis result to be abnormal; otherwise, determining that the descending function fault does not exist, and determining the analysis result to be normal.

3. The Industrial Internet of Things of claim 2, wherein the total platform of the management platform stores a threshold table, and each sub-platform of the management platform corresponds to a unique threshold in the threshold table;

during the analysis of descending function fault, the total platform of the management platform analyzes the time difference data set of each sub-platform of the management platform, retrieves the corresponding threshold in the threshold table and performs difference calculation between the corresponding threshold and the number of consecutive negative values of the difference.

4. The Industrial Internet of Things of claim 2, wherein the sub-platform of the service platform receives the analysis data and obtains an abnormal time node based on the data file, and sends the abnormal time node, the abnormal result data and time difference data set as packaged data to the total platform of the service platform, specifically:

the single-piece manufacturing parameter data further includes a manufacturing start time of the manufacturing equipment during single-piece manufacturing; when the manufacturing equipment uploads the single-piece manufacturing parameter data, the manufacturing start time of the single-piece manufacturing is associated with the total time-consuming data and uploaded together;

after receiving the analysis data, the sub-platform of the service platform extracts the data file, extracts the time difference corresponding to the difference with negative values in the time difference data set, and obtains corresponding multiple total time-consuming data based on the time difference;

based on the multiple total time-consuming data, multiple manufacturing start times corresponding to the multiple total time-consuming data are obtained;

the abnormal time nodes are formed by sequentially ordering the multiple manufacturing start times according to the time sequence of single-piece manufacturing.

5. The Industrial Internet of Things of claim 1, wherein the judging whether the equipment has a descending function fault based on the execution status of the at least one production task includes:

obtaining actual time-consuming of each production task performed by the equipment;

determining multiple time-consuming differences based on the actual time-consuming and corresponding standard time-consuming performed by each production task;

based on the multiple time-consuming differences, determining whether the equipment has the descending function fault.

6. The Industrial Internet of Things of claim 1, wherein the judging whether the equipment has a descending function fault based on the execution status of the at least one production task includes:

determining an actual qualified rate of each production task in the at least one production task based on a rate of qualified products in output products of the at least one production task;

determining multiple qualifications of the equipment based on the actual qualified rate and a corresponding standard qualified rate of each production task; and based on the multiple qualifications, determining whether the equipment has a descending function fault.

7. The Industrial Internet of Things of claim 6, wherein based on the multiple qualifications, the determining whether the equipment has a descending function fault includes:

predicting a fault probability through a fault probability prediction model; wherein the fault probability prediction model is a machine learning model, and the fault probability prediction model includes: a parameter expansion layer and a probability prediction layer; the parameter expansion layer is configured to determine a first feature vector of the equipment based on the multiple qualifications, the probability prediction layer is configured to predict the fault probability of the equipment based on the first feature vector and equipment information of the equipment;

in response to the fault probability being greater than a probability threshold, determining that the equipment has the descending function fault.

8. A control method for Industrial Internet of Things for early warning of descending function fault of equipment, which is realized by a management platform of the Industrial Internet of Things; wherein the Industrial Internet of Things comprises a management platform, a user platform, a service platform, a sensor network platform, and an object platform, wherein the user platform, the service platform, the management platform, the sensor network platform, and the object platform interacting in sequence from top to bottom, the user platform is configured as a terminal device, the service platform is configured as a first server cluster, the management platform is configured as a second server cluster, the sensor network platform is configured as multiple groups of gateway servers or multiple groups of smart routers, the object platform is configured as a smart manufacturing equipment in a production line that performs manufacturing, the first server cluster includes a first total server and multiple first sub-servers, the second server cluster includes a second total server and multiple second sub-servers, both the service platform and the management platform adopt a front sub-platform arrangement, and the sensor network platform adopts an independent arrangement; the front sub-platform arrangement means that the corresponding platform is provided with a total platform and multiple sub-platforms, the multiple sub-platforms store and process data of different types or different receiving objects sent by a lower platform respectively, the total platform aggregates, stores, and processes data of multiple sub-platforms, and transmits the data to an upper platform, the independent arrangement means that the sensor network platform uses different sub-platforms for data storage, data processing and/or data transmission for data of different object platforms, the total platform is configured as the first total server or the second total server, the multiple sub-platforms are configured as the multiple first sub-servers or the multiple second sub-servers; and the control method comprises:

obtaining execution status of at least one production task executed by the equipment in a preset time period;

based on the execution status of the at least one production task, judging whether the equipment has a descending function fault, including:

obtaining, by a sub-platform of the management platform, a recognizable data file corresponding to a single-piece manufacturing parameter from a sub-platform of the sensor network platform, wherein the single-piece manufacturing parameter at least includes total time-consuming data of the manufacturing equipment during single-piece manufacturing, the single-piece manufacturing parameter is uploaded to a corresponding sub-platform of the sensor network platform by the sub-platform of the sensor network platform, the recognizable data file refers to a data file that the management platform recognizes, and the recognizable data file is obtained by converting the single-piece manufacturing parameter data based on the sub-platform of the sensor network platform;

extracting, by the sub-platform of the management platform, the total time-consuming data based on the recognizable data file;

calculating, by the sub-platform of the management platform, a time difference between two adjacent total time-consuming data in sequence according to a time sequence of the single-piece manufacturing based on the total time-consuming data;

sorting, by the sub-platform of the management platform, all time differences in sequence according to the time sequence of the single-piece manufacturing to form a time difference data set;

sending, by the sub-platform of the management platform, the recognizable data file and the time difference data set to the total platform of the management platform;

after receiving the time difference data set, analyzing, by the total platform of the management platform, on descending function fault based on the time difference data set, and when an analysis result is normal, deleting the time difference data set and waiting for the analysis of a re-uploaded time difference data set by the total platform of the management platform; or when the analysis result is abnormal, merging the recognizable data file, abnormal result data, and the time difference data set into an analysis data, and uploading the analysis data to a corresponding sub-platform of the service platform by the total platform of the management platform;

in response to the equipment having the descending function fault, issuing an early warning and repairing the equipment, including:

receiving, by the total platform of the management platform, a self-repair sub-instruction from the corresponding sub-platform of the service platform; and obtaining, by the total platform of the management platform, an instruction code data package corresponding to the self-repair sub-instruction, wherein
    the instruction code data package is pre-stored in the total platform of the management platform,
    the self-repair sub-instruction is sent by the total platform of the service platform,
    the self-repair sub-instruction is determined based on an overhaul instruction by the total platform of the service platform,
    the overhaul instruction is sent by the user platform,
    the overhaul instruction is determined based on grade information by the user platform,
    the grade information is determined based on abnormal result data of packaged data by the total platform of the service platform,
    the packaged data is sent by the corresponding sub-platform of the service platform,
    the packaged data includes an abnormal time node, the abnormal result data, and the time difference data set, and
    the abnormal time node is obtained based on the recognizable data file by the corresponding sub-platform of the service platform;

associating, by the total platform of the management platform, the instruction code data package with the self-repair sub-instruction and sending, by the total platform of the management platform, the instruction code data package and the self-repair sub-instruction to the sub-platform of the management platform; and sending, by the sub-platform of the management platform, the instruction code data package and a recognizable configuration file corresponding to the self-repair sub-instruction to a corresponding object platform through the sub-platform of the sensor platform, wherein
    the self-repair sub-instruction is configured to cause the corresponding object platform to execute self-repair at execution time by calling the instruction code data in the instruction code data package based on the self-repair sub-instruction,
    the recognizable configuration file refers to a configuration file that is recognized by the corresponding object platform,
    the recognizable configuration file is obtained by converting the self-repair sub-instruction based on the sub-platform of the sensor platform, and
    the execution time is determined by the total platform of the service platform based on the overhaul instruction corresponding to different execution times.

9. The control method of claim 8, wherein after the total platform of the management platform receives the time difference data set, and based on the time difference data set, the analysis of descending function fault is specifically as follows:

after the total platform of the management platform receives the time difference data set, it chooses to calculate the difference between absolute values of two adjacent time differences in sequence according to the time sequence of single-piece manufacturing;

when the difference is negative, and the number of consecutive negative values in the difference is greater than a threshold set by the total platform of the management platform, it is determined that the descending function fault exists, and the analysis result is determined to be abnormal; otherwise, it is determined that the descending function fault does not exist, and the analysis result is determined to be normal.

10. The control method of claim 9, wherein the fault grading includes that:

in the corresponding difference of consecutive negative values, the difference with the largest absolute value is set as T1, the difference with the smallest absolute value is set as T2, the specific number of consecutive negative values is set as N, and the classification benchmark is set as F, then the classification benchmark F meets:

$$F=(T1-T2)/N \qquad (1)$$

set the total time-consuming data in the corresponding manufacturing equipment, the maximum allowed absolute value difference is T1', the allowed number of consecutive negative values is N', then the allowed classification criterion is F' and F' meets:

$$F'=T1'/N' \qquad (2)$$

dividing the formula (1) and formula (2) to obtain the classification base Q:

$$Q=F/F'$$

when $0<Q\leq0.2$, the fault is classified as ordinary D-level;
when $0.2<Q\leq0.6$, the fault is classified as general C-level;
when $0.6<Q\leq0.8$, the fault is classified as a severe B-level;
when $0.8<Q$, the fault is classified as a major A-level.

11. The control method of claim 10, wherein when the fault is classified as severe B-level or major A-level, the total platform of the service platform sends the corresponding grade information after the classification to the user platform and executes at the same time:

the total platform of the service platform sends an early warning instruction to the corresponding sub-platform of the service platform and the total platform of the management platform based on the fault grading;

the total platform of the management platform receives the early warning instruction and calls the early warning instruction data package based on the early warning instruction, sends the early warning instruction and the early warning instruction data package to the corresponding sub-platform of the management platform and the sub-platform of the sensor network platform, and the early warning instruction data package is stored in the total platform of the management platform;

the sub-platform of the sensor network platform converts the early warning instruction and the early warning instruction data package into a configuration file that can be recognized by the object platform and sends it to the corresponding object platform;

the object platform performs early warning operation based on the configuration file.

12. The control method of claim 8, wherein the judging whether the equipment has a descending function fault based on execution of at least one production task includes:

obtaining actual time-consuming of each production task performed by the equipment;

determining multiple time-consuming differences based on the actual time-consuming and corresponding standard time-consuming performed by each production task;

based on the multiple time-consuming differences, determining whether the equipment has the descending function fault.

13. The control method of claim 8, wherein the judging whether the equipment has a descending function fault based on execution of at least one production task includes:

determining an actual qualified rate of each production task in the at least one production task based on a rate of qualified products in output products of the at least one production task;

determining multiple qualifications of the equipment based on the actual qualified rate and a corresponding standard qualified rate of each production task; and based on the multiple qualifications, determining whether the equipment has the descending function fault.

14. The control method of claim 13, wherein based on the multiple qualifications, the determining whether the equipment has a descending function fault includes:

predicting fault probability through a fault probability prediction model; wherein the fault probability prediction model is a machine learning model, and the fault probability prediction model includes: a parameter expansion layer and a probability prediction layer; the parameter expansion layer is configured to determine a first feature vector of the equipment based on the multiple qualifications, the probability prediction layer is configured to predict the fault probability of the equipment based on the first feature vector and equipment information of the equipment;

in response to the fault probability being greater than a probability threshold, it is determined that the equipment has the descending function fault.

15. A non-transitory computer-readable medium storing computer instructions, and a processor configured to execute the computer instructions to implement the control method of claim 8.

* * * * *